United States Patent Office 3,126,368
Patented Mar. 24, 1964

---

3,126,368
AZODYESTUFFS CONTAINING A β-CHLORO-CROTONYL RADICAL
Werner Bossard, Riehen, near Basel, and Herbert Seiler, Basel, Switzerland, Paul Dussy, St.-Louis, France, Marcel Reding and André Pugin, Riehen, near Basel, and Hans Peter Kölliker, Munchenstein, Basel-Land, Switzerland, assignors to J. R. Geigy A.-G., Basel, Switzerland
No Drawing. Filed Oct. 16, 1959, Ser. No. 846,800
Claims priority, application Switzerland Oct. 21, 1958
5 Claims. (Cl. 260—151)

The present invention relates to reactive dyes, which can be fixed on textile fibres, containing recurring condensable groups such as hydroxy and amino groups, e.g. on natural or regenerated cellulose and on keratinous fibres, such as wool. Another feature of the instant invention is to provide processes for the manufacture of the new dyes. The invention also relates to dyed material of exceptional wet-fastness, primarily to dyed cellulose material, produced with the new dyes.

The new dyes of our invention correspond to the general Formula I:

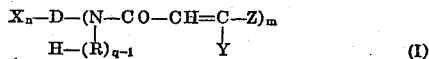
(I)

In this formula,
X means the same or different acid dissociating, water-soluble alkali metal and ammonium salt-forming groups, e.g. carboxylic acid, phosphonic acid, acylated sulphonic acid amide, disulphimide and preferably sulphonic acid groups, $n$ Means a lower whole number of at least two, preferably 2 to 5, D means the radical of monoazo dyestuff, D, more precisely, is monoazo dye selected from the groups consisting of benzene-azo-benzene dyes, of benzene-azo-naphthalene dyes, of benzene-azo-pyrazole dyes, and of naphthalene-azo-naphthalene dyes, which monoazo dyes contain each of the substituents X and

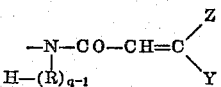

at any of the aromatic nuclei, bound thereto directly or by means of two-valent bridging members such as, e.g. phenylcarbamyl or benzothiazolyl groups and which may also contain heavy metals such as copper, chromium or cobalt in complex union.

Out of the monoazo dyes, D preferably is the radical of a dye selected from the group consisting of the following classes of dyes:

(a) Naphthyl-azo-phenyl dyes containing more than one X at the naphthyl radical and one substituent

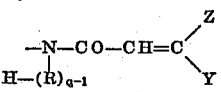

at the phenyl radical in p-position to the azo group;

(b) 4-(phenyl-azo)-5-pyrazolone dyes containing at the phenyl radical a sulphonic acid group in o-position to the azo group and a

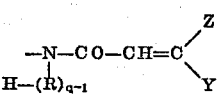

substituent in meta-position to the azo group;

(c) 1-(phenyl-azo)-2-aminonaphthyl dyes containing at the phenyl radical a sulphonic acid group in o-position to the azo group and a

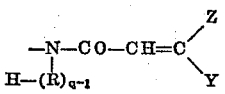

substituent in one of the positions meta and para to the azo group;

(d) 2-(phenyl-azo)-1-hydroxynaphthyl dyes containing a sulphonic acid group at the phenyl radical in o-position to the azo group and a

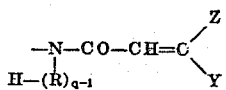

substituent in one of the positions meta and para to the azo group of the phenyl radical and 5, 6, 7 and 8 of the naphthyl radical (if in position 6, also preferably a sulphonic acid group in 3-position and if, as preferred, in position 8, also a sulphonic acid group in 3-position, and optionally an additional sulphonic acid group in one of the 5 and 6 positions);

(e) 0.0'-Dihydroxy-phenyl-azo-naphthyl dyes containing a

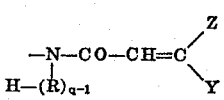

substituent at the azo-free ring of the naphthyl radical and containing also one of the metals copper, chromium and cobalt in complex union;

(f) 0.0'-Dihydroxy-naphthyl-azo-naphthyl dyes containing a

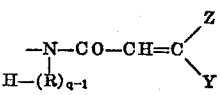

substituent at the azo-free ring of one of the naphthyl radicals and containing also one of the metals copper, chromium and cobalt in complex union.

R in Formula I is a two-valent lower aliphatic radical such as methylene, ethylene, propylene, butylene, hydroxyethylene, hydroxypropylene, Y in Formula I is a halogen of the atomic number 17 to 35, and preferably is chlorine, Z in Formula I is lower alkyl, preferably methyl, and $m$ and $q$ each are one of the integers one and two.

The dyes of the instant invention are obtained by condensing a dye of the general Formula II:

(II)

wherein X, D, R, $n$, $m$ and $q$ have the same meanings as given in Formula I and as explained above, with a carboxylic acid halide of the Formula III:

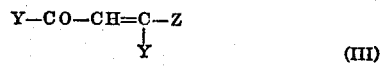
(III)

An alternative method of producing the dyes of the instant invention consists in using dyestuff components containing together at least one

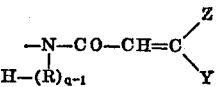

substituent in the manufacture thereof.

In azo dyestuffs of the instant invention, the

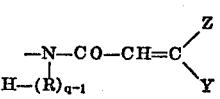

substituent may either be at the diazo or at the coupling component, and also at both of them.

Metal containing mono- and disazo dyes of our invention preferably are of the one basic dye to one metal type if the heavy metal is copper and of the two basic dye to one metal type if the heavy metal is cobalt or chromium;

in the latter case, two same or different basic dyes may be coordinated with chromium or cobalt.

The dyestuffs according to the present invention are easily water-soluble and, in contrast to comparable dyestuffs which contain a chloracetylamino or a β-chloro- or a β-bromo-propionylamino group instead of the acylamino group according to the invention, are particularly suitable for the preparation of wet-fast dyeings on cellulose fibers by impregnating them with dyestuff solutions and subsequent alkaline fixation in the warm.

It is well known in the art of dyeing that it is indispensable for attaining outstanding wet-fastness properties of cellulose dyeings produced with reactive dyes to thoroughly wash out any unfixed dyestuff. Owing to this washing process considerable loss in depth of shade may occur. It is an advantage of our dyes that they show minimal loss in depth of shade on washing after the fixation on the fibres.

The following examples illustrate the invention. The specific manner of application of the new dyestuffs described in each of the examples is valid mutatis mutandis for each dyestuff of the invention. In the examples, if not stated otherwise, parts are given as parts by weight and their relationship to parts by volume is as that of grammes to cubic centimetres. The temperatures are in degrees centigrade.

EXAMPLE 1

42.1 parts of the aminoazo dyestuff

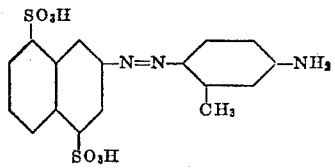

traced in a small sample by diazotisation and coupling, the dyestuff of the formula

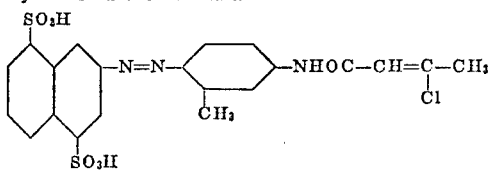

is precipitated by the addition of sodium chloride, filtered off and washed with diluted sodium chloride solution. After drying in the vacuum, the dyestuff is an orange coloured powder which dissolves in water with a yellow-orange and in concentrated sulphuric acid with an orange-red colour.

2 parts of the dyestuff obtained above are dissolved in a dye bath in 4000 parts of water. 100 parts of cotton are entered at 40–45°, the bath is heated within 30 minutes to 80°, 50 g. of sodium chloride per litre being added in portions. At the end of this time, 20 g. of trisodium phosphate per litre are added and the goods are treated for another 60 minutes at this temperature. Finally, the goods are rinsed and soaped at the boil for 30 minutes during which process the soaping solution is only coloured a little. A clear, level, yellow dyeing is obtained which is fast to light, washing and boiling.

If in paragraph 1 of the above example, instead of 42.1 parts of the dyestuff named, equimolecular parts of the dyestuffs given in the following Table 1 are used and the condensation is performed under corresponding conditions with a small excess of the β-chloralkene carboxylic acid chloride given in column 3 of the table, then dyestuffs are obtained which produce cellulose dyeings having similarly good wet fastness properties if the dyeing process described above is used.

The aminoazo dyestuffs given in Table 1 are obtained by diazotising the corresponding amino compound and then coupling with the corresponding aminobenzene derivatives to form the p-amino mono- or p-amino dis-azo dyestuff at a pH value of 2.0 to 4.5.

*Table 1*

| No. | Aminoazo dyestuff | Condensing agent | Shade on cotton |
|---|---|---|---|
| 1 | 2-aminonaphthalene-4.8-disulphonic acid ⟶ 1-amino-2- methoxy-5-methyl benzene | β-chlorocrotonic acid chloride. | yellow. |
| 2 | 1-aminonaphthalene-4.6-disulphonic acid ⟶ 1-amino-3-methylbenzene | do | Do. |
| 3 | 2-aminonaphthalene-4.8-disulphonic acid ⟶ 1-N-ethylamino-3-methyl benzene | do | Do. |
| 4 | 2-aminonaphthalene-4.8-disulphonic acid ⟶ 1-amino-3-acetylaminobenzene | do | Do. |
| 5 | 2-aminonaphthalene-5.7-disulphonic acid ⟶ 1-amino-2-methoxybenzene | do | Do. |
| 6 | 1-aminonaphthalene-4.6-disulphonic acid ⟶ 1-amino-2-methoxy-5-methyl-benzene | do | Do. |
| 7 | 1-aminobenzene-2.5-disulphonic acid ⟶ 1-(3'-aminophenyl)-3-methyl-5-pyrazolone | do | Do. |
| 8 | 2-aminonaphthalene-4.8-disulphonic acid ⟶ 1-aminobenzene | do | Do. |
| 9 | 2-aminonaphthalene-6.8-disulphonic acid ⟶ 1-amino-3-methoxybenzene | do | Do. |
| 10 | 1-hydroxy-4-aminobenzene-6-carboxylic acid-6-sulphonic acid ⟶ 1-amino-2-methoxybenzene. | do | Do. |
| 11 | 6-methyl-2-(3'-sulpho-4'-aminophenyl)-benzthiazole-7-sulphonic acid ⟶ 1-aminobenzene. | do | Do. |
| 12 | mixture from 3-aminopyrene-5.8-disulphonic acid and 3-aminophyrene-5.10-disulphonic acid ⟶ 1-amino-3-methylbenzene. | do | yellow-orange. | are dissolved with sodium carbonate in 500 parts of water so that the reaction is neutral. 21 parts of β-chlorocrotonic acid chloride in 100 parts of acetone and an aqueous sodium carbonate solution are so added dropwise simultaneously to this solution over a period of 1 hour at 30–35° that the mixture always has a neutral reaction. As soon as no more free amino groups can be

EXAMPLE 2

18.8 parts of 1.3-diaminobenzene-4-sulphonic acid are dissolved with the addition of sodium carbonate at a pH value of 6.5–7 in 200 parts of water. 21 parts of β-chlorocrotonic acid chloride in 50 parts of acetone are added dropwise simultaneously with an aqueous sodium carbonate solution at 10–15° within 1 hour in such a manner that the reaction always remains neutral. On completion of the condensation, the reaction product is precipitated by the addition of sodium chloride, filtered off, dissolved in 400 parts of water and diazotised at 0° with 25 parts of 30% hydrochloric acid and 6.9 parts of sodium nitrite. The diazonium compound formed is coupled at a pH of 4–4.5 with a solution of 23.9 parts of 2-amino-8-hydroxynaphthalene-6-sulphonic acid in 200 parts of water. On completion of the coupling, the new dyestuff of the formula

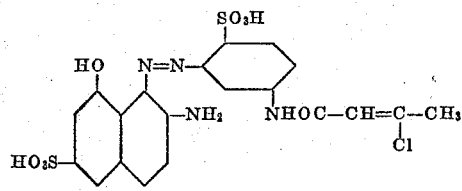

is precipitated with sodium chloride, filtered off and dried in the vacuum at 40–45°. It is a dark red powder which dissolves in water with a red and in concentrated sulphuric acid with a scarlet colour.

If cotton is impregnated in a foulard with a 1% solution of this dyestuff, with the addition of 20 g. of sodium carbonate per litre, at 50°, then rolled up, heated for 2 hours at 95°, rinsed and soaped at the boil for 30 minutes, in which process only a little dyestuff is washed away, then a brilliant red dyeing is obtained which is fast to light and boiling.

Dyestuffs having similar properties are obtained if the diaminobenzene sulphonic acids given in the following Table 2 are condensed with the β-halogen alkene carboxylic acid chlorides given in column 3 under the test conditions described in the above example and the condensation product is diazotised and coupled with equivalent parts of the coupling components given in column 5 at the pH values given in column 4.

(obtained by coupling diazotised 2-amino-1-hydroxy-benzene-4.6-disulphonic acid with 2-amino-5-hydroxy-naphthalene-7-sulphonic acid in an alkaline medium and treating the aminomonoazo dyestuff obtained with agents giving off copper) are dissolved, with a neutral reaction, with sodium carbonate in 1200 parts of water. 21 parts of β-chlorocrotonic acid chloride in 50 parts of acetone and an aqueous sodium carbonate solution are added dropwise simultaneously to this solution within 1 hour at 30–35° in such a manner that the reaction mixture always remains neutral. As soon as no more aminomonoazo dyestuff can be traced by diazotising and coupling a small sample, the new dyestuff of the formula

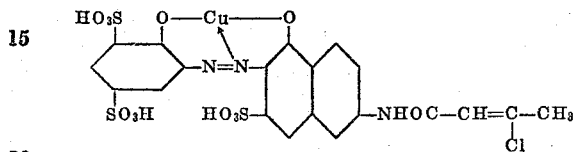

is precipitated by the addition of sodium chloride, filtered off and dried in the vacuum at 30–35° C. The dark powder dissolves in water and in concentrated sulphuric acid with a ruby colour.

To attain wet fast dyeings, cotton is foularded at 50° with an aqueous solution containing 2% dyestuff, 20% urea and 2% sodium carbonate, squeezed out, dried and then fixed for 5 minutes at 140–160°, rinsed and then soaped at the boil for 30 minutes. The shade and depth of the dyeings are only slightly changed by the soaping. A strong, ruby dyeing is obtained which is fast to light and boiling.

Dyestuffs having similar properties are obtained if, instead of the above aminomonoazo dyestuff, corresponding parts of the complex metal compounds of the aminoazo dyestuffs given in the following Table 3 are used and the condensation is performed under the same reaction conditions with the corresponding number of parts of β-halogen alkene carboxylic acid chloride.

*Table 2*

| No. | Diamino compound | Condensing agent | Coupling at pH | Coupling component | Shade on cotton |
|---|---|---|---|---|---|
| 1 | 1.3-diamino-benzene-4-sulphonic acid. | β-chlorocrotonic acid chloride. | 7–8 | 1-benzoylamino-8-hydroxy-naphthalene-3.6-disulphonic acid. | red. |
| 2 | ___do___ | ___do___ | 6–7 | 1-(2'-chloro-5'-sulpho-phenyl)-3-methyl-5-pyrazolone | yellow. |
| 3 | ___do___ | ___do___ | 6–7 | 1-(2'-naphthyl)-3-methyl-5-pyrazolone-5'.7'-disulphonic acid. | Do. |
| 4 | ___do___ | ___do___ | 6–7 | 1-(2'.5'-dichloro-4'-sulphophenyl)-3-methyl-5-pyrazolone | Do. |
| 5 | ___do___ | ___do___ | 4–5 | 1-(3'-sulphophenyl)-3-methyl-5-iminopyrazole | Do. |
| 6 | ___do___ | ___do___ | 4–5 | 2-aminonaphthalene-6-sulphonic acid | orange. |
| 7 | ___do___ | ___do___ | 4–5 | 2-aminonaphthalene-5.7-disulphonic acid | Do. |
| 8 | ___do___ | ___do___ | 4–5 | 2-aminonaphthalene-3.6-disulphonic acid | Do. |
| 9 | ___do___ | ___do___ | 4–5 | 2-N-methylamino-8-hydroxynaphthalene-6-sulphonic acid. | blue-red. |
| 10 | ___do___ | ___do___ | 7–8 | 2-(β-chlorocrotonylamino)-5-hydroxynaphthalene-7-sulphonic acid. | orange. |
| 11 | 1.3-diamino-benzene-4-sulphonic acid. | β-chlorocrotonic acid chloride. | 7–8 | 1-(β-chlorocrotonylamino)-8-hydroxynaphthalene-3.6-disulphonic acid. | red. |
| 12 | ___do___ | ___do___ | 8–8.5 | 2-hydroxynaphthalene-3.6-disulphonic acid | scarlet. |
| 13 | ___do___ | ___do___ | 8–8.5 | 2-hydroxynaphthalene-6.8-disulphonic acid | orange. |
| 14 | 1.4-diamino-benzene-3-sulphonic acid. | ___do___ | 4–4.5 | 2-amino-8-hydroxynaphthalene-6-sulphonic acid | red. |
| 15 | ___do___ | ___do___ | 4–4.5 | 2-aminonaphthalene-5.7-disulphonic acid | orange. |
| 16 | ___do___ | ___do___ | 4–4.5 | 2-aminonaphthalene-3.6-disulphonic acid | Do. |

EXAMPLE 3

58 parts of the aminomonoazo dyestuff of the formula

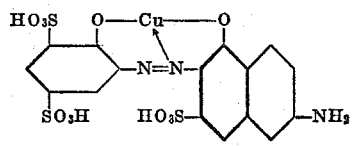

The aminoazo dyestuffs given in Table 3 are produced by diazotising the o-aminohydroxy compound given with sodium nitrite in mineral acid solution and coupling the diazo compound with the corresponding coupling component in a pyridine-soda alkaline or in a pyridine-ammonia alkaline medium. The amino-o,o'-dihydroxyazo compounds obtained are metallised by treating in the known manner with the usual agents giving off heavy metal.

*Table 3*

| No. | Aminoazo dyestuff | Heavy metal complex | Condensing agent | Shade on cotton |
|---|---|---|---|---|
| 1 | 1-amino-2-hydroxybenzene-5-sulphonic acid——→2-amino-5-hydroxynaphthalene-7-sulphonic acid. | Cu | β-chlorocrotonic acid chloride. | raisin. |
| 2 | 1-amino-2-hydroxybenzene-5-sulphonic acid——→1-amino-8-hydroxynaphthalene-4.6-disulphonic acid. | Cu | do | violet. |
| 3 | do | Co | do | blue violet. |
| 4 | 1-amino-2-hydroxybenzene-5-sulphonic acid——→1-amino-8-hydroxynaphthalene-3.6-disulphonic acid. | Cu | do | violet. |
| 5 | do | Co | do | blue. |
| 6 | 1-amino-2-hydroxybenzene-3.5-disulphonic acid——→1-(4'-aminophenyl)-3-methyl-5-pyrazolone. | Cu | do | yellow-brown. |
| 7 | do | Co | do | orange. |
| 8 | do | Cr | do | orange-red. |
| 9 | 1-amino-2-hydroxybenzene-3.5-disulphonic acid——→2-amino-8-hydroxynaphthalene-6-sulphonic acid. | Cu | do | raisin. |

EXAMPLE 4

59 parts of the sodium salt of the chromium-containing mono azo dyestuff of the type 2 dyestuff molecules to 1 chromium atom (obtained by coupling equimolecular amounts of 1-diazo-2-hydroxy-6-nitronaphthalene-4-sulphonic acid with 2-amino-5-hydroxynaphthalene-7-sulphonic acid in an alkaline medium and reacting in the warm with a 0.6 molar amount of the sodium salt of disalicylato chromic acid), are dissolved in 300 parts of water with a neutral reaction. At 0–5°, 21 parts of β-chlorocrotonic acid chloride are added dropwise to this solution while stirring, the addition being made within ‐hour and the pH of the mixture being kept at 6–7 by the simultaneous dropwise addition of an aqueous solution of sodium carbonate. As soon as no more diazotisable amino groups can be traced and, thus, the condensation reaction has finished, the dyestuff solution is carefully evaporated to dryness in a vacuum at 40–50°. The new dyestuff of the formula

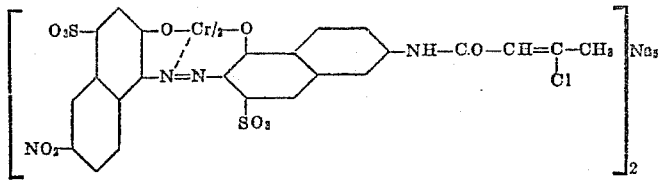

is obtained as a black powder which dissolves very easily in water with a violet-black colour.

Cotton is impregnated with a 20% dyestuff solution, which solution also contains 20 parts of sodium carbonate and 200 parts of urea per litre. The impregnated material is squeezed out, dried in a moderately warm stream of air and then heated for 4 minutes at 140–160°. It is then soaped at the boil in a 0.5% soap solution, rinsed with cold water and dried. A greenish grey dyeing which is .ast to light and wet is obtained.

Table 4 gives further metal-containing dyestuffs according to the invention which are produced by using equivalent amounts of heavy metal-containing aminoazo dyestuffs and acylating as described in the above example.

EXAMPLE 5

31.9 parts of 1-amino-8-hydroxynaphthalene-3.6-disulphonic acid are dissolved with sodium carbonate at a pH value of 6–6.5, in 200 parts of water. 21 parts of β-chlorocrotonic acid chloride in 50 parts of acetone are then added dropwise within 1 hour at 20–25° and the pH value of the reaction solution is kept at 6–6.5 by the gradual addition dropwise of sodium carbonate solution. When no more diazotisable amino groups can be traced, the reaction product is precipitated with sodium chloride, filtered off and dissolved in 300 parts of water at 20–25°. 30 parts of sodium bicarbonate are added to this solution and then a solution of 17.3 parts of diazotised 1-aminobenzene-2-sulphonic acid is poured in within 30 minutes. As soon as the coupling is complete, the new dyestuff which precipitates of the formula

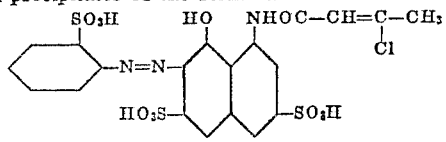

is filtered off, washed with diluted sodium chloride solution and dried in the vacuum at 40–45°. It is a dark powder which dissolves in water with a red and in concentrated sulphuric acid with a blue-red colour.

If cotton is foularded at 20° with a 2% aqueous solution of this dyestuff, dried, then treated with a 1% sodium hydroxide solution which contains 30% sodium chloride, steamed for 5 minutes at 100–103°, then rinsed and soaped at the boil for 30 minutes, a brilliant red dyeing which is fast to boiling is obtained.

If in the above example, instead of the condensation product from 1-amino-8-hydroxynaphthalene-3.6-disulphonic acid and β-chlorocrotonic acid chloride, a corresponding amount of the coupling components given in the

*Table 4*

| No. | Metal complex compound of | | Shade on cotton |
|---|---|---|---|
| | Amino azo dystuff | Metal to dye ratio | |
| 1. | 6-nitro-1-diazo-2-hydroxynaphthalene-4-sulphonic acid——→2-amino-5-hydroxynaphthalene-7-sulphonic acid. | Cu:1 | raisin. |
| 2. | 6-nitro-1-diazo-2-hydroxynaphthalene-4-sulphonic acid——→1-amino-8-hydroxynaphthalene-4-sulphonic acid. | Co:2 | reddish black. |
| 3. | 1-diazo-2-hydroxynaphthalene-4-sulphonic acid——→1-amino-8-hydroxynaphthalene-4-sulphonic acid. | Cu:1 | bluish violet. |
| 4. | 6-nitro-1-diazo-2-hydroxynaphthalene-4-sulphonic acid——→1-amino-8-hydroxynaphthalene-4.6-disulphonic acid. | Cu:1 | reddish blue. | following Table 5 is used, and if instead of 1-aminobenzene-2-sulphonic acid, a corresponding amount of the diazo components given in the table is used and otherwise the same procedure is followed, then dyestuffs having similar properties are obtained.

Table 5

| No. | Diazonium compound | Coupling component | Shade on cotton |
|---|---|---|---|
| 1. | 1-aminobenzene-2-sulphonic acid | 1-(β-chlorocrotonylamino)-8-hydroxynaphthalene-4,6-disulphonic acid. | red. |
| 2. | 1-amino-4-methylbenzene-2-sulphonic acid | ......do......... | red. |
| 3. | 1-amino-3-acetylaminobenzene-4-sulphonic acid. | ......do......... | red. |
| 4. | 1-aminobenzene-2-sulphonic acid | 2-(β-chlorocrotonylamino)-8-hydroxynaphthalene-6-sulphonic acid. | orange. |
| 5. | 1-aminobenzene-2-sulphonic acid | 2-(β-chlorocrotonylamino)-5-hydroxynaphthalene-7-sulphonic acid. | orange. |
| 6. | 1-amino-4-acetylaminobenzene-2-sulphonic acid. | ......do......... | orange. |
| 7. | 1-hydroxy-4-aminobenzene-2-carboxylic acid-6-sulphonic acid. | ......do......... | orange. |
| 8. | 1-aminobenzene-2-sulphonic acid | 1-(3'-β-chlorocrotonylaminobenzoylamino)-8-hydroxynaphthalene-3,6-disulphonic acid. | red. |
| 9. | 1-amino-4-methylbenzene-2-sulphonic acid | ......do......... | red. |
| 10. | 1-aminobenzene-2-sulphonic acid | 1-(3'-β-chlorocrotonylaminobenzoylamino)-8-hydroxynaphthalene-4,6-disulphonic acid. | red. |

What we claim is:
1. Monoazo dyestuff selected from the group consisting of
   (a) compounds of the formula

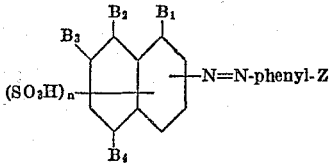

wherein
Z is a member selected from the group consisting of —NH—CO—CH=C(Cl)—CH$_3$, —N(C$_2$H$_5$)—CO—CH=C(Cl)—CH$_3$ and

Z being in p-position to the azo group,
B$_1$ is a member selected from the group consisting of hydrogen and hydroxy,
B$_2$ is a member selected from the group consisting of hydrogen, benzylamino and Z,
B$_3$ being a member selected from the group consisting of hydrogen, amino, N-methylamino and Z,
B$_4$ being a member selected from the group consisting of hydrogen and Z, not more than one of B$_2$, B$_3$ and B$_4$ being Z, and
n is an integer of 1 to 2;
(b) compounds of the formula

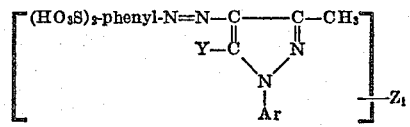

wherein
Z and n are as aforedefined;
(c) compounds of the formula

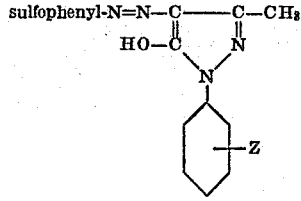

wherein
Z$_1$ is —NHCOCH=C(Cl)CH$_3$ and is linked to phenylene,
Y is a member selected from the group consisting of hydroxyl and amino,
Ar is a member selected from the group consisting of phenyl, chlorophenyl and naphthyl, and being substituted with one to two —SO$_3$H groups;
(d) disulfopyrene-N=N-phenyl-Z dyestuff wherein Z is as aforedefined;
(e) o,o'-dihydroxyphenyl-N=N-naphthyl dyestuff with one Z group, as aforedefined, linked to the azo-free naphthyl ring;
(f) o,o' - dihydroxynaphthyl-N=N-naphthyl dyestuff having from 2 to 4 —SO$_3$H groups, not more than two of which are linked to each component of the said dyestuff, the naphthyl moiety being substitued with Z group, as aforedefined, at the azo-free ring;
(g) compounds of the formula

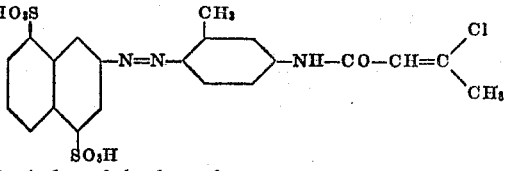

wherein
Z is as aforedefined; and
(h) copper, chromium and cobalt metal complex compounds of dyestuffs defined in (e), (f) and (g).

2. A dye of the formula

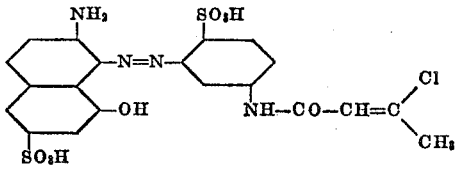

3. A dye of the formula

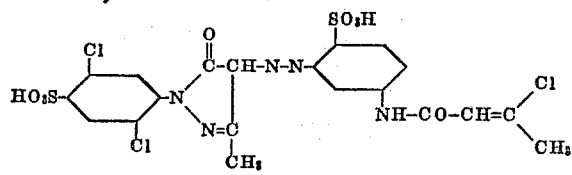

4. A dye of the formula

5. A dye of the formula
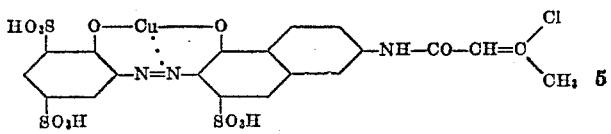
References Cited in the file of this patent
UNITED STATES PATENTS
| | | |
|---|---|---|
| 2,339,739 | Blackshaw et al. | Jan. 18, 1944 |
| 2,657,205 | Heyna et al. | Oct. 27, 1953 |
| 2,743,267 | Heyna et al. | Apr. 24, 1956 |
| 2,906,747 | Wolfrum | Sept. 29, 1959 |
| 2,978,289 | Barker et al. | Apr. 4, 1961 |
| 2,984,659 | Illy | May 16, 1961 |
FOREIGN PATENTS
| | | |
|---|---|---|
| 1,200,241 | France | June 29, 1959 |
OTHER REFERENCES
Frick et al.: "Textile Research Journal," vol. 97, pages 92–99, 1957.
Wegmann: "Textile-Praxis," October 1958, page 1056.